United States Patent [19]
Abad et al.

[11] Patent Number: 4,775,466
[45] Date of Patent: Oct. 4, 1988

[54] FUEL SEPARATOR SYSTEM

[75] Inventors: Santiago Abad; John B. Mallay, both of Houston, Tex.

[73] Assignee: Muesco, Inc., Houston, Tex.

[21] Appl. No.: 925,707

[22] Filed: Oct. 30, 1986

[51] Int. Cl.⁴ .................................... B01D 17/032
[52] U.S. Cl. ............................. 210/127; 210/172; 210/536; 137/147
[58] Field of Search ............ 210/119, 121, 123, 416.4, 210/533, 536, 127, 172; 137/174, 195, 447, 413, 625.41, 625.42, 625.46, 625.47

[56] References Cited

U.S. PATENT DOCUMENTS

| | | | |
|---|---|---|---|
| 1,737,171 | 11/1929 | Parsons | 137/447 |
| 2,701,620 | 2/1955 | Crawford | 137/174 |
| 2,854,994 | 10/1958 | Glasgow | 137/447 |
| 4,136,711 | 1/1979 | Rubin et al. | 137/447 |

*Primary Examiner*—Barry S. Richman
*Assistant Examiner*—Richard D. Jordan
*Attorney, Agent, or Firm*—Browning, Bushman, Zamecki & Anderson

[57] ABSTRACT

A control for draining water accumulated in a fuel tank, without loss of fuel or ingestion of water into an associate fuel system, is responsive to a flotation device weighted to float at the water-fuel interface. The flotation device is connected by a lever to turn a rotor in a pressurized chamber thereby selectively connecting pressure or exhaust to respective actuation control ports for a drain valve and fuel valve.

3 Claims, 3 Drawing Sheets

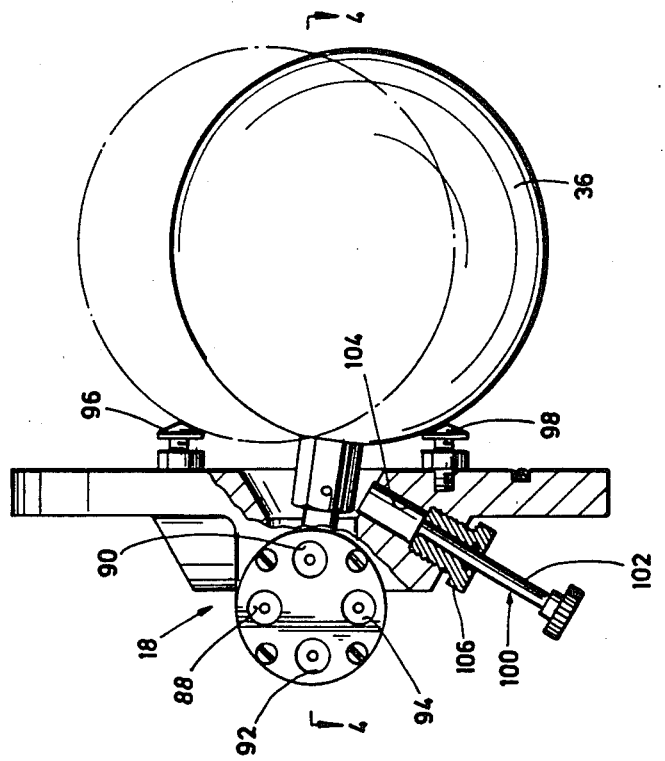
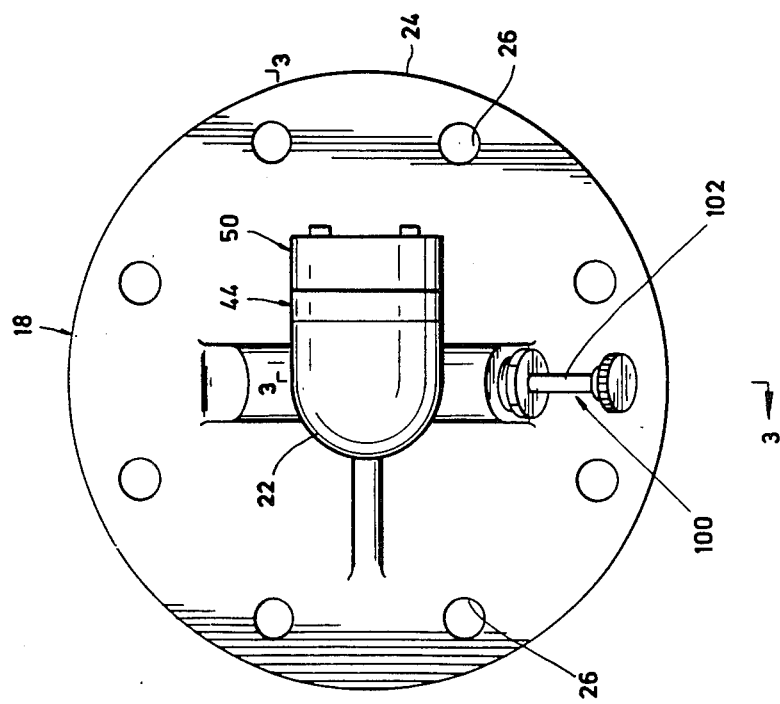

FUEL SEPARATOR SYSTEM

BACKGROUND OF THE INVENTION

1. Field of the Invention

The present invention relates to an improved apparatus for draining water accumulated in the bottom of a fuel tank without loss of fuel, and in particular to an apparatus which will prevent the water accumulated in the fuel tank from being ingested into the system.

2. The Prior Art

Any industry which is involved in the use of liquid fuel faces the problem of water accumulating in a storage tank over a period of time. The water, usually resulting from condensation, can become an appreciable amount creating the need to dispose of the water before it becomes a problem. It will be appreciated that in the aviation industry, in particular, the water would be additional undesirable weight as well as reducing the volume available for fuel. Both of these factors would have an affect on range. Further, it is highly desirable to be able to separate the water from the fuel without wasting any fuel and/or creating environmental problems. It is usually not too much of a problem to separate fuel and water since the water has a greater density than the fuel and will thus settle to the bottom of the container.

Any system utilized for removing the water must be both reliable and automatic and should be able to withstand considerable pressures, up to 300 pounds per square inch. The systems are thus controlled by man-made limitations as well as the physics of the particular fluids involved.

SUMMARY OF THE INVENTION

The present invention is a float actuated control to drain water from a fuel tank without loss of fuel. A float connected to a rotor in a pressurized chamber causes the rotor to move in such manner that a wiper carried thereby selectively closes, connects or opens to pressure a series of ports connected to a drain valve, exhaust valve and fuel valve.

BRIEF DESCRIPTION OF THE DRAWINGS

The present invention will now be described by way of example with reference to the accompanying drawings in which:

FIG. 2 is a side elevation of the control of the present invention;

FIG. 3 is a section taken along line 3—3 of FIG. 2;

DETAILED DESCRIPTION OF THE PREFERRED EMBODIMENT

Figure 1:
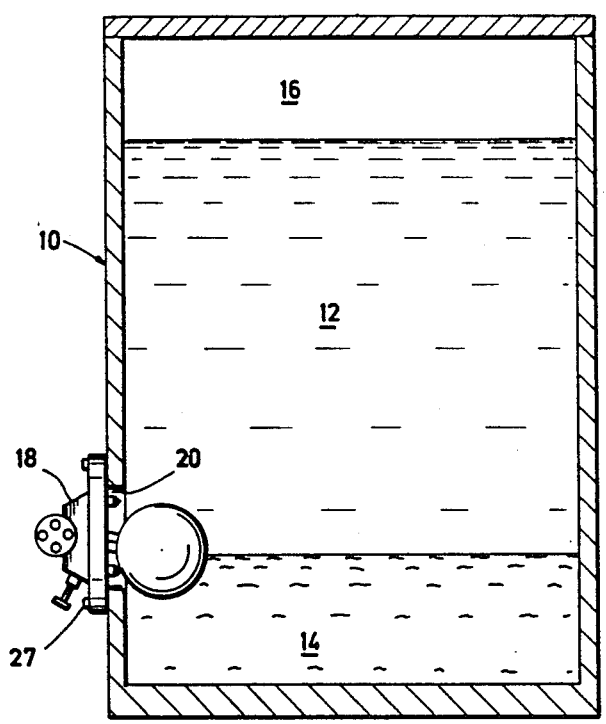
FIG. 1 is a diagrammatic vertical section through a fuel tank incorporating the control of the present invention.

The present invention is shown schematically in FIG. 1 in connection with a filter separator tank 10 containing fuel 12, water 14 and air 16. The subject separator control 18 is mounted in an aperture 20 in the tank in the general area of the water-fuel interface.

The subject separator control 18 has a housing 22 provided with an annular flange 24 having an array of mounting holes 26 for receiving mounting means 27 therein. Sealing between the control 18 and tank 18 is provided by O-ring 28. The housing 22 defines an L-shaped cavity 20 having a first end 32 opening in the annular flange 24 and a second end 34 opening normal to the surface of the flange 24. Ball float 36 has an internally threaded adapter 38 which receives therein one end of a lever arm 40, the other end of the lever arm being secured to a rotor 42. Body 44 has an outer profile 46 adapted to be received in the opening 34 and an inner annular profile 48 adapted to receive a cover 50 therein. The body 44 and cover 50 define therebetween a cavity 52 with oppositely directed axial bores 54, 56. The rotor 42 has a body portion 58 with oppositely directed integral axial shafts 60, 62. Sealing is provided between the rotor 42, the body 44 and the cover 50 by O-rings 64, 66, 68, 70. The rotor body 58 has a passage 72 parallel to the axis of the shafts 60, 62 containing a control 74 formed by a member 76 having an integral head 78 and shaft 80 with a spring 82 mounted on the shaft and biasing a wiping seal 84. The rotor body 58 illustrated also contains at least one second passage 86. The cover 50 is provided with drain port 88, pressure port 90, exhaust port 92 and fuel port 94, each port receiving connection means (not shown) for its respective valve (also not shown). The control is also provided with upper and lower adjustable float limiting means 96, 98 (FIG. 3) in flange 24 and a manual actuation means 100 formed by a plunger 102 mounted in a passage 104 and secured therein by a threaded member 106.

The ball float 36 of the present invention must be weighted so as to float at the water-fuel interface. When it is immersed in the fluid, it will displace of weight of fluid equal to its volume. The ball float 36 attached to the lever 40 of length L pivots around the axis of rotor 42 to produce a torque which is available to actuate the rotor.

The system should be designed for a limited up and down movement of the lever, preferably about $8\frac{1}{2}°$ in either direction. This would provide for compact construction as well as adequate torque, as mentioned above.

Figure 5:
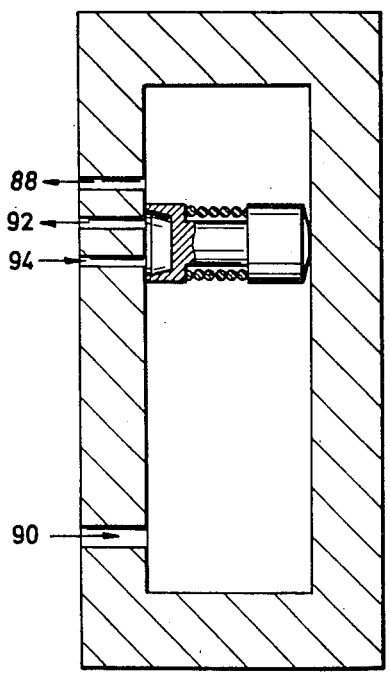
FIG. 5 is a diagrammatic representation of the wiper in a float up condition.
Figure 6:
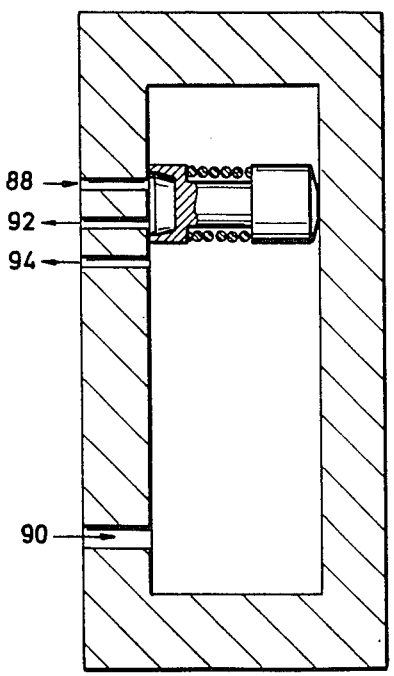
FIG. 6 is a diagrammatic representation of the wiper in a float down position.

With the lever 40 in the down position, as shown in FIG. 3 and schematically in FIG. 6, the drain valve port 88 is connected to exhaust port 92. This keeps the drain valve (not shown) closed, which is as it should be since with the lever down this means there is not sufficient water in the fuel tank 10 to require draining. In this position, the fuel valve port 94 is open supplying pressure from port 90 to the fuel valve (not shown) to keep it open. With the lever in the intermediate position, both the fuel 94 and drain 88 ports will be open to pressure while exhaust port 92 is closed by wiping seal 84. The lever in the intermediate position means that there is a small amount of water in the tank and the fuel valve port 94 and fuel valve (not shown) can be kept open while the drain valve is opened, by applying pressure to port 88, to dispose of the water. With the lever in the upper position, FIG. 5, the fuel valve port 94 is closed by being connected to exhaust port 92 while the drain valve port 88 is opened to pressure from port 90. This means that there is a large amount of water in the tank and the fuel valve must be closed to avoid ingesting water, while the drain valve is opened to dispose of the water.

Figure 4:
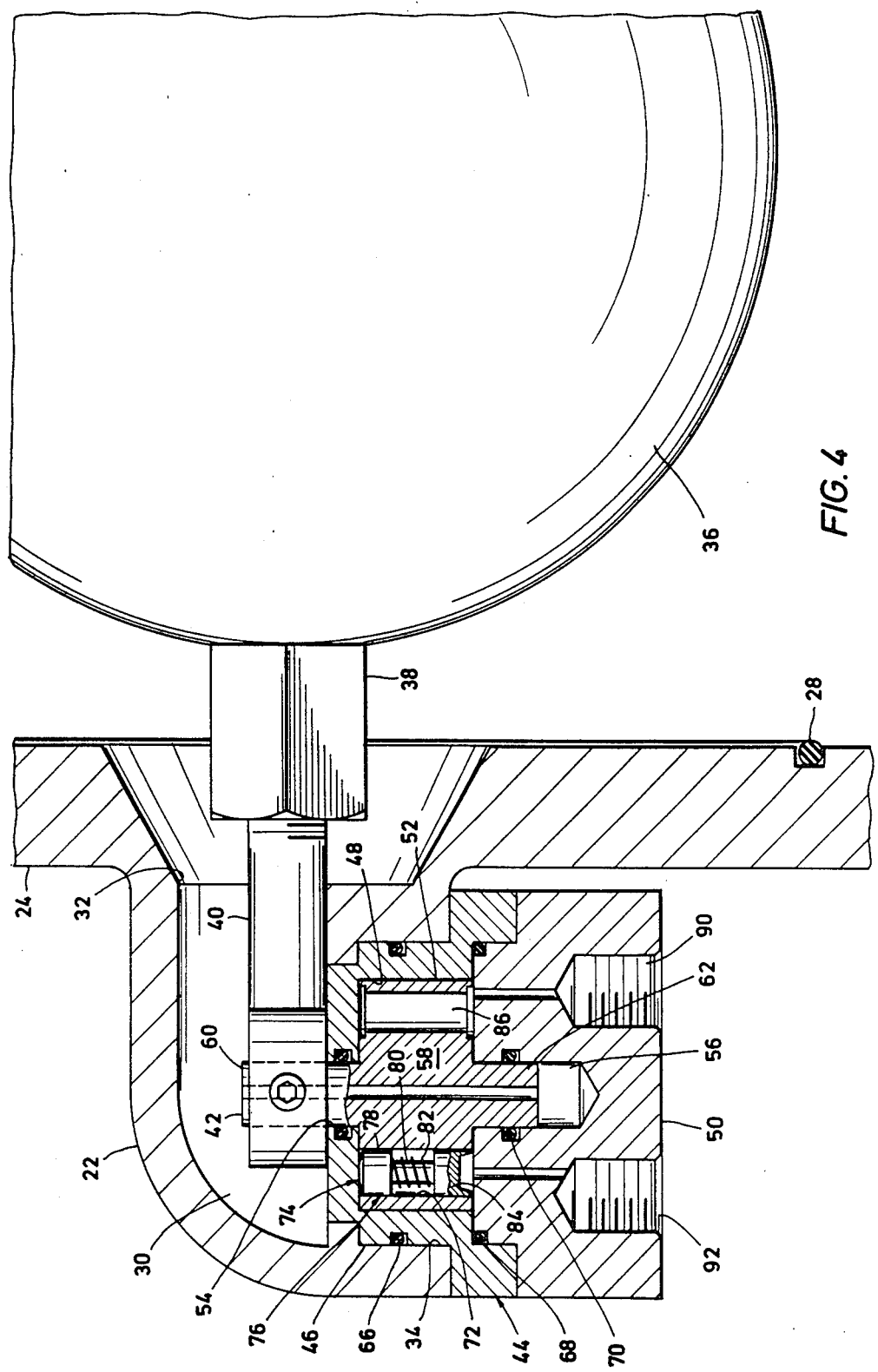
FIG. 4 is a section taken along line 4—4 of FIG. 3 and shown on a larger scale.

The rotor body 58 illustrated in FIG. 4 is symmetric with respect to shafts 60, 62. However, it could be formed as an eccentric lobe of sufficient size to carry the wiper seal 84. The seal 84, in turn, would have to be of sufficient size to cover two of the ports 88, 92, 94. The ports are sized, spaced and located to be selectively connected by wiper seal 84 in the manner described above.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. An apparatus for controlling the removal of water from a pressurized fuel tank comprising:
    a housing means mounted on said fuel tank, said housing means defining a passageway positioned to be in open communication with an aperture into the interior of said fuel tank;
    a body secured to said housing means, said body defining a cavity, said body further including means defining a first port in open communication with said cavity having means for communicating with a pressure source, means defining a second port in open communication with said cavity having means for communicating with an exhaust valve, means defining a third port in open communication with said cavity having means for communicating with a water drain valve and means defining a fourth port in open communication with said cavity having means for communicating with a fuel valve;
    rotor means rotatably disposed in said cavity and having a first portion external of said body and extending into said passageway, said first portion defining a first area, said rotor means including seal means to selectively seal off the pressure from said cavity to at least one of said second, third and fourth ports in response to rotation of said rotor;
    flotation means adapted to be disposed in said fuel tank and positioned to float at a water/fuel interface;
    means extending through said passageway and operatively interconnecting said flotation means and said first portion of said rotor whereby movement of said flotation means in response to a change in the position of said water/fuel interface operates to rotate said rotor means and effects selective sealing off of at least one of said second, third or fourth ports from pressure in said cavity, and
    means to substantially balance any pressure exerted on said first area of said rotor by pressure from the interior of said fuel tank.

2. The apparatus of claim 1 wherein said seal means is arranged to selectively seal off at least two of said second, third and fourth ports.

3. The apparatus of claim 1 wherein said body further defines a chamber, said chamber being sealed from said cavity, said rotor having a second portion extending into said chamber, said second portion defining a second area, and means providing open communication between said passageway and said chamber whereby said pressure exerted on said first area of said rotor by pressure from the interior of said fuel tank is simultaneously exerted on said second area of said rotor, said first area and said second area being substantially the same.

* * * * *